United States Patent [19]

Yamaguchi et al.

[11] Patent Number: 4,637,293
[45] Date of Patent: Jan. 20, 1987

[54] SLANT PLATE TYPE HYDRAULIC DEVICE

[75] Inventors: Kouji Yamaguchi; Eiichiro Kawahara, both of Tokorozawa; Noboru Yamamoto, Kamifukuoka, all of Japan

[73] Assignee: Honda Giken Kogyo Kabushiki Kaisha, Tokyo, Japan

[21] Appl. No.: 783,390

[22] Filed: Oct. 3, 1985

[30] Foreign Application Priority Data

Nov. 14, 1984 [JP] Japan .................................. 59-239967

[51] Int. Cl.[4] .......................... F01B 13/04; F01M 1/00
[52] U.S. Cl. ........................................ 91/507; 91/499; 184/6.17
[58] Field of Search .......................... 91/499, 507, 506; 184/6.17

[56] References Cited

U.S. PATENT DOCUMENTS

| 3,165,892 | 1/1965 | Roberts | 91/499 |
| 3,304,885 | 2/1967 | Orth | 91/507 |
| 3,611,879 | 10/1971 | Alderson | 91/507 |
| 3,687,012 | 8/1972 | Stein | 91/507 |
| 3,739,692 | 6/1973 | Bell | 91/506 |
| 3,958,901 | 5/1976 | Drevot | 184/6.17 |

FOREIGN PATENT DOCUMENTS 2804912 8/1978 Fed. Rep. of Germany ........ 91/499

Primary Examiner—Carlton R. Croyle
Assistant Examiner—Paul F. Neils
Attorney, Agent, or Firm—Armstrong, Nikaido, Marmelstein & Kubovcik

[57] ABSTRACT

A lubricant chamber encloses the sliding contact portions of a slant plate and the plurality of shoes to confine lubricating oil therein. The lubricating oil is permitted to leak from the chamber at a rate greater than the rate of flow of oil from the pressure pockets formed on the sliding faces of the shoes.

11 Claims, 8 Drawing Figures

SLANT PLATE TYPE HYDRAULIC DEVICE

BACKGROUND OF THE INVENTION

The present invention relates to a slant plate type hydraulic device comprising: a cylinder block; a slant plate arranged to face the cylinder block and to rotate relative to the same; a multiplicity of plungers arranged in a manner to freely slide in the axial direction of the cylinder block positioned in an annular array around the axis; and a shoe attached to the leading end of each of the plungers and held in sliding contact with the slant plate. More particularly, the present invention relates to either a slant plate type hydraulic pump which is adapted to increase oil pressure by turning the cylinder block and the slant plate relative to each other or a slant plate type hydraulic motor which is adapted to turn the cylinder block and the slant plate relative to each other by reciprocating the plungers.

In order to lubricate the sliding contact portions between the slant plate and the shoe of a slant plate type hydraulic device, it is known in the prior art to fill up the casing which accommodates the cylinder block and the slant plate with lubricating oil (as in Japanese Patent Publication No. 43-24627).

A hydraulic device having its casing filled up with lubricating oil, as has been described above, can sufficiently lubricate the sliding contact portions between the slant plate and the shoe but has a defect in that the resistance of the lubricating oil to movement or stirring by the rotating members, especially by the rotations of the plungers, is so high as to cause a reduction in the operation efficiency. If, with that defect in mind, the amount of the lubricating oil in the casing is reduced so as to lower the resistance to movement by the rotating members, the slant plate and the cylinder block are partially exposed above the surface of the oil to invite a fear of disadvantage that the slant plate and the shoe seize or wear because of shortage of supply of the lubricating oil.

OBJECT AND SUMMARY OF THE INVENTION

The present invention has been conceived in view of the background described above and has as an object to provide a slant plate type hydraulic device in which lubrication of the sliding contact portions of the slant plate and the shoe is ensured without dropping the operation efficiency of the device.

In order to achieve the above-specified object, the present invention is characterized in that the aforementioned slant plate has a lubricant chamber enclosing the sliding contact portions of the slant plate and the shoe for confining lubricating oil where it is needed.

Since the sliding contact portions of the slant plate and the shoe are held in an excellently lubricated state by the lubricating oil confined in the lubricant chamber on the slant plate, the relative sliding motions of the slant plate and the shoe are smoothly effected.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

The present invention will be described in the following in connection with the embodiments thereof with reference to the accompanying drawings.

Figure 1:
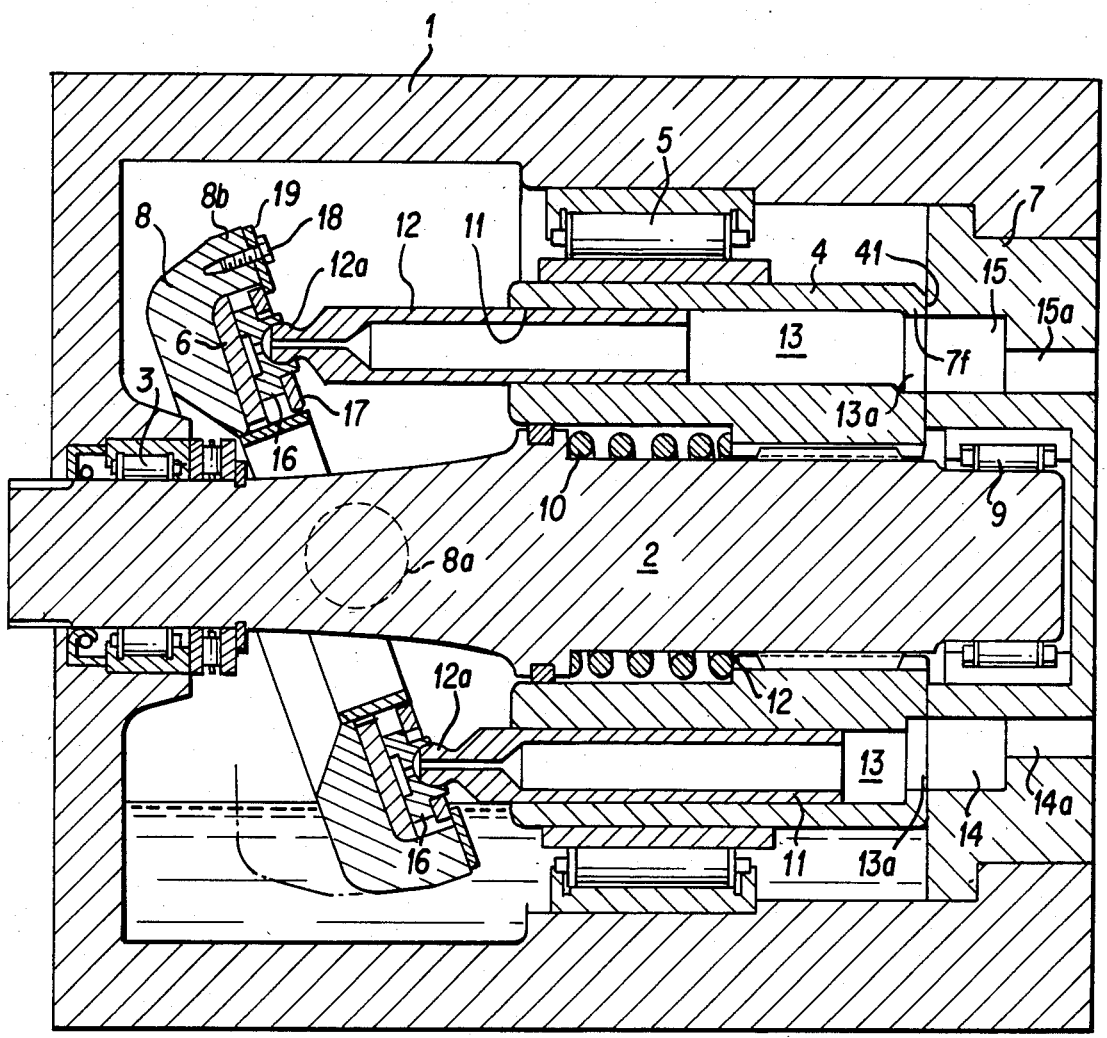
FIG. 1 is a longitudinally sectional side elevation showing the first embodiment of the present invention.

In FIG. 1, there is shown a first embodiment in which the present invention is applied to a hydraulic pump. In a casing 1, an input shaft 2 is rotatably supported on bearing 3. A cylinder block 4 is slidably splined to a central portion of the shaft 2. The cylinder block 4 is rotatably supported in the casing 1 through a bearing 5. In the casing 1, moreover, a slant plate 6 is disposed at one end of the cylinder block 4 and a distributor ring 7 is disposed at the other end of the same.

The slant plate 6 is formed into an annular shape and surrounds the input shaft 2. The slant plate 6 is fitted in a slant plate holder 8 which is also formed into an annular shape and supported through trunnion shafts 8a (shown in FIG. 2) such that it can slant with respect to the casing 1. As a result, the slant plate 6 slants together with its holder 6 around the trunnion shafts 8a so that its slanting angle with respect to the axis of rotation of the cylinder block 4 can be desirably varied.

The distributor plate 7 is fixed in the casing 1 and has its central portion supporting the leading end of the input shaft 2, which extends through the cylinder block 4, on a bearing 9. In order to hold the opposing faces 7f and 4f of the distributor plate 7 and the cylinder block 4 in close contact with each other in a relatively slidable manner, a spring 10 is sandwiched under compression between the input shaft 2 and the cylinder block 4, for urging the cylinder block 4 against the distributor plate 7.

The cylinder block 4 is formed with a plurality of cylinder bores 11, 11 . . . , and so on which extend equidistantly around and in parallel with the axis of rotation of the cylinder block 4 and in which an equal number of plungers 12, 12 . . . , and so on are fitted.

Each plunger 12 defines a pump chamber 13 in the corresponding cylinder bore 11. A pump port 13a merging into the pump chamber 13 is formed in the aforementioned end face 4f of the cylinder block 4. Moreover, the pump ports 13a, 13a, . . . , and so on of all the pump chambers 13, 13 . . . , are arranged on a common circle having a center on the axis of rotation of the cylinder block 4.

The distributor plate 7 is formed in one half of the aforementioned end face 7f with one suction groove 14, which communicates with the opposing several pump ports 13a, and in the other half with one discharge groove 15 which communicates with the opposing several pump ports 13a. Suction and discharge ports 14a and 15a merging into those suction and discharge grooves 14 and 15, respectively, are formed in the outer end face of the distributor plate 7. Although not shown, the hydraulic motor has its discharge and suction ports connected to the suction port 14a and the discharge port 15a, respectively.

Each plunger 12 has its leading end portion formed into a ball end 12a to which a shoe 16 is joined and held in sliding contact with the surface of the slant plate 6.

Each plunger 12 is usually biased by the oil pressure of the pump chamber 13 to project from the cylinder bore 11 thereby forcing the shoe 16 into contact with the slant plate 6.

If the input shaft 2 is turned, the cylinder block 4 rotates on its axis of rotation so that the upper projecting plunger 12 is pushed into its associated cylinder bore 11 by the slant plate 6 as it is brought downward As a result, the volume of the pump chamber 13 located at the back of the plunger 12 decreases so that the working oil confined therein under pressure is pumped from the discharge port 15a of the distributor plate 7 to the hydraulic motor (not shown ). On the other hand, the lower plunger 12 extends as the cylinder 4 rotates and it is brought upward so that the volume of the pump chamber 13 located at the back of that plunger 12 expands. As a result, the working oil discharged from the hydraulic motor (not shown) is sucked through the suction port 14a of the distributor plate 7 into that pump chamber 13.

In this suction stroke, the hydraulic pressure acting upon the back of the plunger 12 drops so that the shoe 16 is liable to leave or lift off of the slant plate 6. At the bottom dead center where the stroke changes from discharge to suction, on the other hand, the plunger 12 is so biased by its inertia that the shoe 16 tends to leave the slant plate 6.

In order to hold the shoe 16 in sliding contact with the slant plate 6 against those forces, therefore, a press plate 17 is provided for retaining the shoe 16 by holding the back of it. The press plate 17 is fitted rotatably in an annular projection 8b projects axially from the outer circumference of the slant plate holder 8. A retainer plate 19 which is fixed to the projection 8b by means of a bolt 18 retains the press plate 17 in position. The press plate 17 is formed with a plurality of through holes 20, 20 . . . , and so on through which the joining portions of the respective shoes 16 to the plungers 12 extend. As a result, the press plate 17 can rotate together with the shoes 16, 16, . . . , and so on as the plungers 12, 12, . . . , and so on rotate.

Each shoe 16 is formed in its front face with a hydraulic pressure pocket 21 which communicates with the pump chamber 13 via a series of oil holes 22 and 23 formed in the plunger 12 and the shoe 16, respectively. As a result, the pressure oil in the pump chamber 13 is supplied via the oil holes 22 and 23 to the hydraulic pressure pocket 21 to apply pressure to the shoe 16 so that the shoe 16 may receive the protruding thrust of the plunger 12. As a result, the pressure oil reduces the contact pressure between the shoe 16 and the slant plate 6 and lubricates the sliding faces of the shoe and the slant plate.

Figure 2:
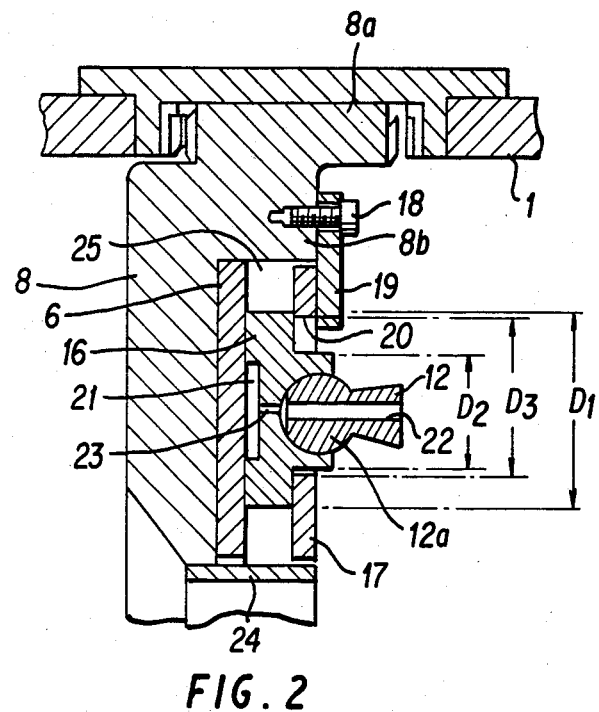
FIG. 2 is an enlarged and longitudinally sectional top plan view showing the trunnion shafts and their neighborhoods of FIG. 1.

As better seen in FIG. 2, a cylindrical partition 24 is fitted on the inner circumference of the slant plate holder 8, the partition 24 facing the inner circumference of the aforementioned press plate 17 with a small gap being left therebetween. The partition 24 defines together with the slant plate holder 8 and the press plate 17, a lubricant chamber 25 which encloses the sliding contact portions of the shoe 16 and the slant plate 6.

Thus, the pressure oil in each hydraulic pressure pocket 21 continuously leaks out through the clearance between the sliding faces of the shoe 16 and the slant plate 6 so that the leaking oil fills up the lubricant chamber 25 and then leaks out from the gaps around the press plate 17. As a result, the lubricant chamber 25 is continually filled with fresh lubricating oil, by which the sliding faces of the shoe 16 and the slant plate 6 can be lubricated without fail even from the outside of the shoe 16.

If, in this instance, the pressure in the lubricant chamber 25 approaches the pressure of the hydraulic pressure pocket 21, the function of this pocket 21 to hydraulically bear the shoe 16 is negated. Therefore, the gaps around the press plate 17 are so properly selected in accordance with the leakage rate of the oil from the hydraulic pressure pocket 21 so that the lubricant chamber 25 may confine the oil while being held substantially at the prevailing pressure inside the casing 1 which can be atmospheric pressure.

When the slanting angle of the slant plate 6 changes, the shoe 16 moves radially of and relative to the slant plate 6 to cause relative motions between the shoe 16 and the press plate 17. In order to minimize the leakage rate of the oil, which will leak from the lubricant chamber 25 through the clearance between the press plate 17 and the shoe 16, irrespective of the slant of the slant plate 6, therefore, it is necessary to form a close to zero axial clearance between the press plate 17 and the shoe 16. This necessity can be achieved by satisfying the following inequality:

$$D_3 < (D_1 + D_2)/2,$$

wherein:

$D_1$ . . . the diameter of the abutting portion of the shoe 16 against the press plate 17;

$D_2$ . . . the diameter of the extending portions of the shoe 16 through the through hole 20; and $D_3$ . . the diameter of the through hole 20 of the pressure plate 17.

The oil having leaked from the lubricant chamber 25 resides in the bottom of the casing 1 from which it is pumped by a supply pump (not shown) to a supply oil passage (not shown) leading to the suction port 14a. As a result, the casing 1 only need retain a small amount of oil to lubricate the bearing 5 of the cylinder block 4. Thus, the stirring resistance of the oil by the rotation of the cylinder block 4 and the movement of the plungers 12 can be reduced.

Figure 3:
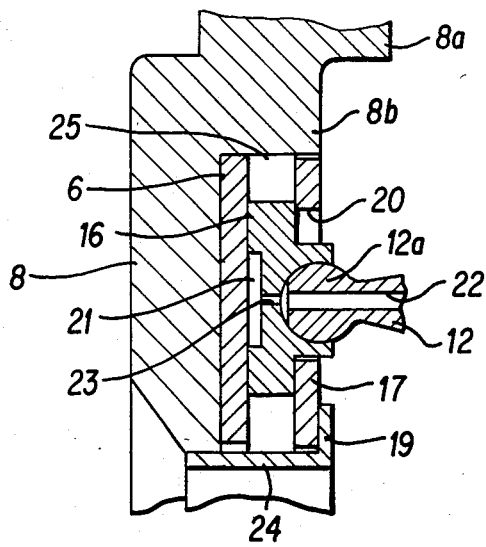
FIGS. 3 to 8 are sectional views similar to FIG. 2 showing the second to seventh embodiments of the present invention.

A second embodiment of the present invention shown in FIG. 3 is constructed by forming the retainer plate 19 to integrally extend from the leading end of the partition 24.

Figure 4:
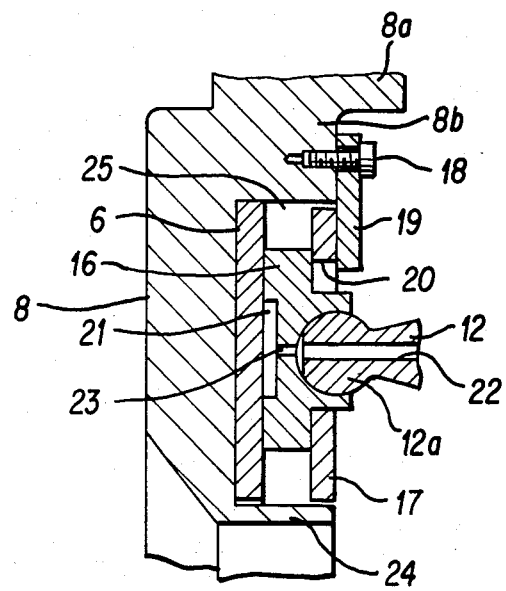

A third embodiment of the present invention shown in FIG. 4 is constructed by forming the partition 24 integrally with the slant plate holder 8.

Figure 5:
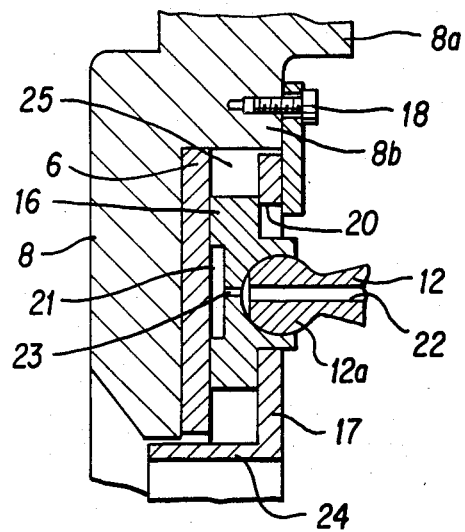

A fourth embodiment of the present invention shown in FIG. 5 is constructed by forming the partition 24 integrally with the pressure plate 17 to establish a gap between the partition 24 and the slant plate holder 8 for the desired rate of leakage of oil from the chamber 25.

Figure 6:
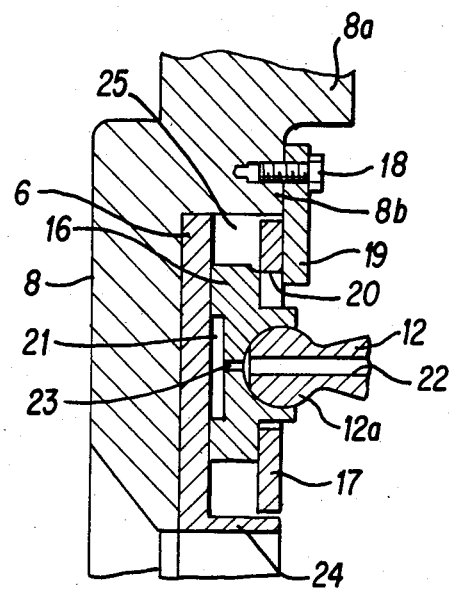

A fifth embodiment of the present invention shown in FIG. 6 is constructed by forming the partition 24 integrally with the slant plate 6.

Figure 7:
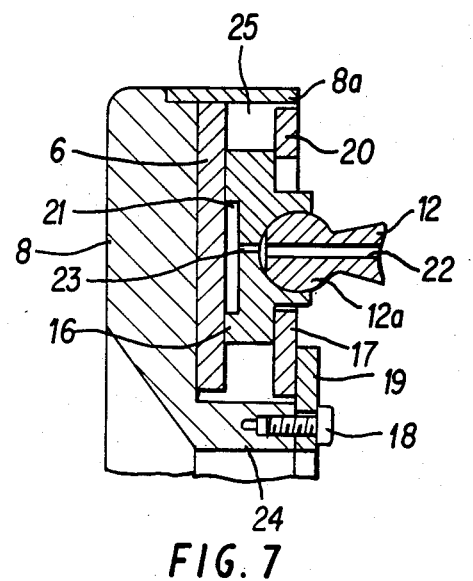

A sixth embodiment of the present invention shown in FIG. 7 is constructed by making the annular projection 8b of a tubular member provided on the outer circumference of the slant plate holder 8 and by fastening the retainer plate 19 to the partition 24, which is formed integrally with the slant plate holder 8, by means of bolt 18.

Figure 8:
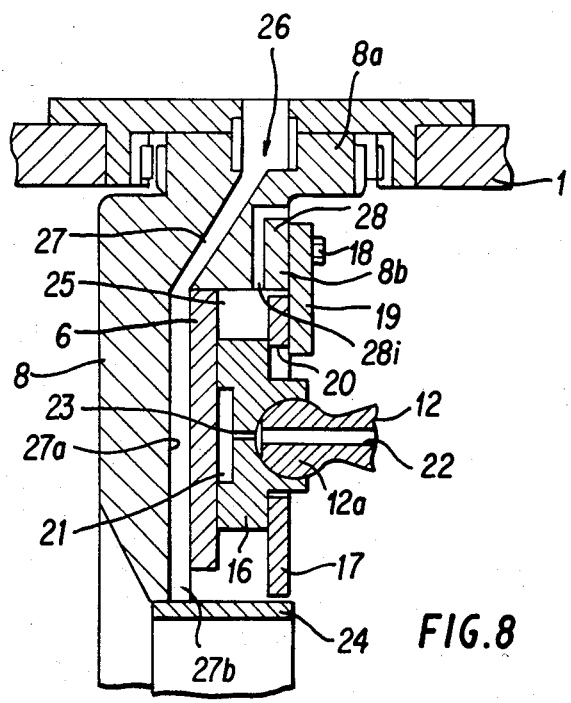

An eighth embodiment of the present invention shown in FIG. 8 is constructed such that the lubricant chamber 25 is supplied with additional lubricating oil, which is pumped from a supply pump 26, in addition to the oil leaking from the hydraulic pressure pocket 21 of the shoe 16. More specifically, the slant plate holder 8 is formed with an entrance oil passage 27, which extends through the trunnion shafts 8a to lead to the lubricant chamber 25, and an exit oil passage 28 which leads from the lubricant chamber 25 to the inside of the casing 1, such that the lubricating oil is pumped to the entrance oil passage 27 from the supply pump 26.

The aforementioned respective oil passages 27 and 28 can be replaced by pipes.

According to this eighth embodiment, the lubricating oil supplied from the supply pump 26 can be at a relatively low temperature so that the slant plate 6 and the shoe 16 can have their sliding faces not only lubricated but also effectively cooled.

If, in this instance, the entrance oil passage 27 is partially formed as a recess 27a closed by the bottom of the slant plate 6, the slant plate 6 can be advantageously cooled more by the oil flowing through the recess 27a.

If the entrance oil passage 27 has its exit 27b arranged at the inner circumference of the lubricant chamber 25 and the exit oil passage 28 has its entrance 28i arranged at the outer circumference of the lubricant chamber 25, both the inflow of the oil from the entrance oil passage 27 to the lubricant chamber 25 and the outflow of the oil from the lubricant chamber 25 to the exit oil passage 28 can be smoothed by the action of the centrifugal force which is applied to the oil in the lubricant chamber 25 as each shoe 16 rotates around the axis of the cylinder block 4. As a result, the circulation of the oil to the lubricant chamber 25 can be made satisfactory even when the hydraulic device runs at a high speed.

Incidentally, all of the parts in FIGS. 3 to 8 that correspond to those of the first embodiment shown in FIGS. 1 and 2, are indicated at the identical reference numerals.

As has been described hereinbefore, according to the present invention, the sliding contact portions of the slant plate and the shoe are enclosed by the lubricant chamber confining the lubricating oil on the slant plate. As a result, sliding contact portions can be held in the excellently lubricated state at all times so that the relatively sliding motions of the slant plate and the shoe can be smoothed. This makes it unnecessary to reserve lubricating oil in a large amount in the casing accommodating the cylinder block, the slant plate and so on. As a result, the stirring resistance of the oil by the rotating members can be remarkably reduced to make a contribution to improvements in the operation efficiency of the hydraulic device.

It is readily apparent that the above-described slant plate type hydraulic device meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A slant plate type hydraulic device comprising:
   a casing;
   a cylinder block rotatably mounted in said casing and having a plurality of axial bores;
   a slant plate arranged to face said cylinder block and to rotate relative to the same;
   a multiplicity of plungers arranged in an annular array around said axis to freely slide in said bored in the axial direction of said cylinder block;
   a slant plate holder mounted in said casing and supporting said slant plate; and
   a shoe attached to the leading end of each of said plungers and held in sliding contact with said slant plate, the improvement comprising said slant plate having a lubricant chamber enclosing the sliding contact portions of said slant plate and said shoes to confine lubricating oil therein, a press plate having a plurality of through holes being rotatably mounted on said slant plate holder, said shoes and said leading ends of said plungers extending through said through holes, and an axially extending cylindrical partition being provided on an inner circumference of said slant plate holder, said press plate and said partition together with said slant plate holder defining said lubricant chamber.

2. A slant plate type hydraulic device as claimed in claim 1, wherein each plunger has an axially extending oil hole therethrough from said bore of said cylinder block to said leading end, each said shoe has an axially extending oil hole therethrough communicating with said oil hole of said plunger, and the improvement comprises a hydraulic pressure pocket formed on a front sliding face of each shoe and communicating with said oil hole of said shoe, pressure oil from said cylinder bore passing through said oil holes and creating a clearance by leakage between each said sliding face and said slant plate, said lubricant chamber having a rate of leakage greater than the leakage through said clearances.

3. A slant plate type hydraulic device as claimed in claim 2, wherein the improvement comprises means for supplying and removing additional lubricating oil to and from said lubricant chamber for cooling of said sliding faces and said slant plate.

4. A slant plate type hydraulic device as claimed in claim 3, wherein the improvement comprises said cooling means comprising an entrance oil passage in said slant plate holder communicating with said lubricant chamber, a supply pump connected to said entrance oil passage, and an exit oil passage communicating said lubricant chamber with an interior of said casing.

5. A slant plate type hydraulic device as claimed in claim 4, wherein the improvement comprises said entrance oil passage communicating with said lubricant chamber at a radially inwards position thereof, and said exit oil passage communicating with said lubricant chamber at a radially outwards position thereof.

6. A slant plate type hydraulic device as claimed in claim 1, wherein the improvement further comprises a retainer plate attached to said slant plate holder retaining said press plate in position.

7. A slant plate type hydraulic device as claimed in claim 6, wherein the improvement further comprises an annular projection axially extending from an outer circumferential portion of said slant plate holder, said retainer plate being fixed to said projection.

8. A slant plate type hydraulic device as claimed in claim 6, wherein the improvement comprises said retainer plate being integrally formed with said cylindrical partition.

9. A slant plate type hydraulic device as claimed in claim 6, wherein the improvement comprises said cylindrical partition being formed integrally with said slant plate holder, said retainer plate being fixed to said partition.

10. A slant plate type hydraulic device as claimed in claim 6, wherein the improvement comprises said cylindrical partition being integrally formed with said slant plate.

11. A slant plate type hydraulic device as claimed in claim 6, wherein the improvement comprises said press plate being integrally formed with said cylindrical partition.

* * * * *